United States Patent
Taguchi et al.

(10) Patent No.: US 7,037,993 B2
(45) Date of Patent: May 2, 2006

(54) NORBORNENE-BASED RING-OPENING POLYMERIZATION POLYMER, PRODUCT OF HYDROGENATION OF NORBORNENE-BASED RING-OPENING POLYMERIZATION POLYMER, AND PROCESSES FOR PRODUCING THESE

(75) Inventors: Kazunori Taguchi, Tokyo (JP); Seiji Okada, Tokyo (JP); Yasuo Tsunogae, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/510,513

(22) PCT Filed: Apr. 7, 2003

(86) PCT No.: PCT/JP03/04392

§ 371 (c)(1),
(2), (4) Date: Oct. 22, 2004

(87) PCT Pub. No.: WO03/085025

PCT Pub. Date: Oct. 16, 2003

(65) Prior Publication Data

US 2005/0148746 A1    Jul. 7, 2005

(30) Foreign Application Priority Data

| Apr. 8, 2002 | (JP) | 2002-104996 |
| Apr. 11, 2002 | (JP) | 2002-109210 |
| Apr. 11, 2002 | (JP) | 2002-109213 |

(51) Int. Cl.
  C08G 61/06 (2006.01)
(52) U.S. Cl. .................. 526/281; 526/171; 526/256; 526/262; 526/271; 525/326.8; 525/327.4; 525/328.5; 525/329.5; 525/338
(58) Field of Classification Search ........... 526/171, 526/256, 262, 271, 281; 525/326.8, 327.4, 525/328.5, 329.5, 338
See application file for complete search history.

(56) References Cited

U.S. PATENT DOCUMENTS 5,219,966 A * 6/1993 Asrar .................. 526/262
6,599,677 B1 * 7/2003 Szmanda et al. ........ 430/270.1
6,790,579 B1 * 9/2004 Goodall et al. ............ 430/170

FOREIGN PATENT DOCUMENTS

| DE | 3331011 A1 * | 3/1984 |
| JP | 01-132626 A | 5/1989 |
| JP | 5058200 A | 3/1993 |
| JP | 05-097978 A | 4/1993 |
| JP | 6043365 B | 2/1994 |
| JP | 8-311172 A * | 11/1996 |
| JP | 11-130843 A | 5/1999 |
| JP | 2001-139776 A | 5/2001 |
| WO | WO-99/14635 A1 * | 3/1999 |
| WO | WO 01/42332 A1 | 1/2003 |

* cited by examiner

*Primary Examiner*—Fred Teskin
(74) *Attorney, Agent, or Firm*—Birch, Stewart, Kolasch & Birch, LLP

(57) ABSTRACT

A norbornene ring-opened polymer which in the molecule has repeating units represented by the formula (1):

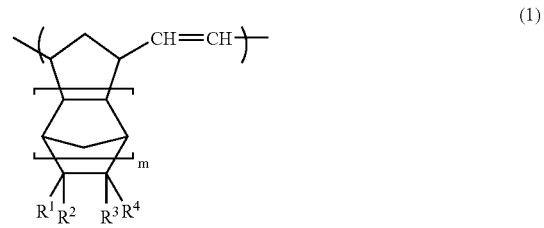

wherein $R^1$ represents Q, $R^2$ represents Q or $C(=O)R^5$, $R^3$ represents Q or $C(=O)R^6$, and $R^4$ represents Q or $X—C(=O)R^7$ (wherein Q represents hydrogen, a $C_{1-10}$ hydrocarbon group, etc.; $R^5$, $R^6$ and $R^7$ each represents hydroxyl, $C_{1-10}$ alkoxyl, etc., provided that $R^6$ and $R^7$ may be bonded to each other to constitute oxygen, NH, etc.; X represents methylene, etc., provided that when $R^2$ is Q, then $R^3$ is $C(=O)R^6$ and $R^4$ is $X—C(=O)R^7$ and that when $R^4$ is Q, then $R^2$ is $C(=O)R^5$, $R^3$ is $C(=O)R^6$, and the configuration of $R^2$ and $R^3$ is trans, and m is 0 or 1), the polymer having a weight-average molecular weight as determined by gel permeation chromatography of 1,000 to 1,000,000. Also provided is a hydrogenation product of the norbornene ring-opened polymer. The norbornene ring-opened polymer and the hydrogenation product are excellent in heat resistance, electrical properties, etc.

13 Claims, No Drawings

NORBORNENE-BASED RING-OPENING POLYMERIZATION POLYMER, PRODUCT OF HYDROGENATION OF NORBORNENE-BASED RING-OPENING POLYMERIZATION POLYMER, AND PROCESSES FOR PRODUCING THESE

TECHNICAL FIELD

The present invention relates to a novel norbornene ring-opened polymer, a hydrogenated product of the polymer, and processes for producing these polymers.

BACKGROUND ART

In recent years, a ring-opened polymer of a norbornene monomer having a functional group as a substituent (hereinafter may be referred to as "functional group-containing norbornene monomer") and a hydrogenated product thereof have attracted attention as functional group-containing polymers exhibiting excellent heat resistance, electric characteristics, low water absorption, and the like. These polymers also exhibit excellent adhesion to an inorganic material such as a metal or glass and excellent compatibility with an organic material such as an antioxidant, plasticizer, UV absorber, coloring agent, curing agent, or flame retardant, and, therefore, are expected to be used for various composite materials.

Conventionally, as a process for producing such a functional group-containing polymer, a process of obtaining the polymer by ring-opening polymerization, using a metathesis polymerization catalyst, of a norbornene monomer having a functional group at either the 5-position or 6-position, or both positions as substituents, obtained by Diels-Alder addition reaction of cyclopentadiene with a functional group-containing olefin such as acrylate, methacrylate, acrylonitrile, maleic anhydride, or maleimide have been known, for example (Japanese Patent Application Laid-open No. S50-58200; Japanese Patent Publication No. S60-43365; Polymer, Vol. 39, Number 39, No. 5, pp. 1007–1014, 1998; Macromolecules, Vol. 33, p. 6239, 2000; etc.).

As another process for efficiently producing a functional group-containing polymer, a process of ring-opening polymerization, in the presence of a metathesis polymerization catalyst, of tetracyclododecene having a functional group at either the 8-position or 9-position, or both positions, as substituents, obtained by Diels-Alder addition reaction of a norbornene monomer having a functional group at either the 5-position or 6-position, or both positions, as substituents, with cyclopentadiene (Japanese Patent Application Laid-open No. H1-132626, WO 01/42332, etc.).

However, these processes require a large amount of a polymerization catalyst in order to obtain a ring-opened polymer at a high yield, because the functional group-containing norbornene monomer used as a raw material has low polymerization reactivity. Further, the functional group-containing norbornene monomer has low polymerization reactivity as compared with a norbornene monomer having no functional group. When copolymerizing these monomers, a large amount of the functional group-containing norbornene monomer is required, and a copolymer having a desired composition ratio and molecular weight is not obtained in some cases. In addition, a norbornene monomer having a carboxyl group as a substituent has particularly low polymerization reactivity. Even if the monomer is polymerized by ring-opening polymerization as is, a ring-opened polymer can not be efficiently obtained.

Therefore, a norbornene ring-opened polymer having a carboxyl group as a substituent has been conventionally produced by a process of polymerizing a norbornene monomer containing an ester group by ring-opening polymerization, optionally hydrogenating the polymer, and hydrolyzing the ester group introduced into the polymer (Japanese Patent Application Laid-open No. H5-97978, Japanese Patent Application Laid-open No. 2001-139776); a process of polymerizing a norbornene monomer containing a carboxylic anhydride group by ring-opening polymerization, optionally hydrogenating the polymer, and hydrolyzing or alcoholizing the carboxylic anhydride group introduced into the polymer (Japanese Patent Application Laid-open No. H11-130843); or the like. However, these processes require an additional step of hydrolyzing (or alcoholizing) an ester group or acid anhydride group after the polymerization step, and are operated in a complicated manner.

In the Diels-Alder addition reaction of cyclopentadiene with a functional group-containing olefin, a norbornene monomer having a functional group at either the 5-position or 6-position, or both positions, is obtained as a mixture of an endo isomer and an exo isomer, in which the production of the endo isomer is generally larger than that of the exo isomer. It is known that, when a functional group-containing norbornene monomer is polymerized by ring-opening polymerization in the presence of a metathesis polymerization catalyst, the exo isomer in the functional group-containing norbornene monomer is easily polymerized, whereas the endo isomer is polymerized in a low polymerization rate and a low polymerization conversion rate (e.g. Macromolecules, Vol. 33, pp. 6239–6248, 2000; Polymer, Vol. 39, pp. 1007–1014, 1998).

Therefore, in the production of a ring-opened polymer of a functional group-containing norbornene monomer, many attempts of separating and purifying only the exo isomer in the functional group-containing norbornene monomer or isomerizing the endo isomer in the monomer to the exo isomer have been made.

However, in order to obtain a high-purity exo isomer, the process must involve a separation and purification step or an isomerization step, which requires much labor.

The present invention has been achieved in view of these problems of the prior art. An object of the present invention is to provide a norbornene ring-opened polymer obtained by ring-opening polymerization of a functional group-containing norbornene monomer that is easily available and has a high polymerization reactivity, a hydrogenated product of the polymer, and processes for producing these polymers.

DISCLOSURE OF THE INVENTION

As a result of extensive studies to achieve the above object, the present inventors have found that a norbornene ring-opened polymer containing a functional group can be efficiently obtained by ring-opening metathesis polymerization of a specific norbornene monomer having a carboxylic anhydride group or a carboxylic imide group as a substituent in the presence of a metathesis polymerization catalyst.

The present inventors have found that the target norbornene ring-opened polymer can be efficiently obtained by ring-opening metathesis polymerization, in the presence of a metathesis polymerization catalyst, of the following norbornene monomers (a)–(c):

(a) a norbornene monomer having a carboxylic anhydride group or a carboxylic imide group as a substituent, (b) a norbornene monomer having a carboxyl group and an ester group as substituents or having a carboxyl group or an ester group as a substituent in a specific configuration, and (c) a norbornene monomer having an alkoxycarbonyl group (carboxyl group) and an alkoxycarbonylalkyl group (carboxyalkyl group) as substituents.

Further, the present inventors have found that a hydrogenated product of norbornene ring-opened polymer can be efficiently obtained by hydrogenation of the resulting norbornene ring-opened polymer in the presence of a hydrogenation catalyst. These findings have led to the completion of the present invention.

First, the present invention provides a norbornene ring-opened polymer in which having a repeating unit represented by the formula (1):

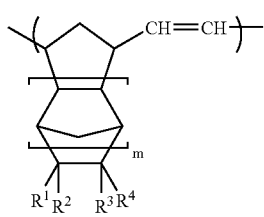

(1)

wherein $R^1$ represents Q, $R^2$ represents Q or $C(=O)R^5$, $R^3$ represents Q or $C(=O)R^6$, and $R^4$ represents Q or $X-C(=O)R^7$, wherein Q represents a hydrogen atom or a hydrocarbon group having 1–10 carbon atoms which may be substituted with a hetero atom-containing functional group or a halogen atom, $R^5$, $R^6$, and $R^7$ individually represent a hydroxyl group or an alkoxyl group having 1–10 carbon atoms which may be substituted with a hetero atom-containing functional group or a halogen atom, or $R^6$ and $R^7$ may be bonded together to form an oxygen atom, a sulfur atom, or $NR^8$, wherein $R^8$ represents a hydrogen atom, a hydroxyl group, a substituted or unsubstituted hydrocarbon group having 1–10 carbon atoms, an alkoxyl group having 1–10 carbon atoms, or an alkoxycarbonyl group having 1–10 carbon atoms, and X represents a substituted or unsubstituted alkylene group having 1–5 carbon atoms; and wherein, when $R^2$ is Q, $R^3$ is $C(=O)R^6$ and $R^4$ is $X-C(=O)R^7$, and, when $R^4$ is Q, $R^2$ is $C(=O)R^5$, $R^3$ is $C(=O)R^6$, and $R^2$ and $R^3$ are in the trans position with respect to one another; and m represents 0 or 1; the norbornene ring-opened polymer having a weight average molecular weight determined by gel permeation chromatography of 1,000–1,000,000.

In the norbornene ring-opened polymer of the present invention, the repeating unit represented by the formula (1) is preferably any one of the following repeating units (A)–(C):

(A) a repeating unit represented by the formula (2),

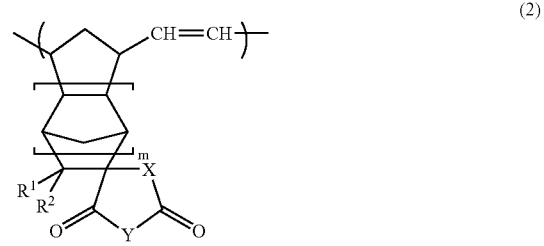

(2)

wherein $R^1$, $R^2$, X, and m are the same as defined above, and Y represents an oxygen atom, a sulfur atom, or $NR^8$, wherein $R^8$ is the same as defined above, (B) a repeating unit represented by the formula (3),

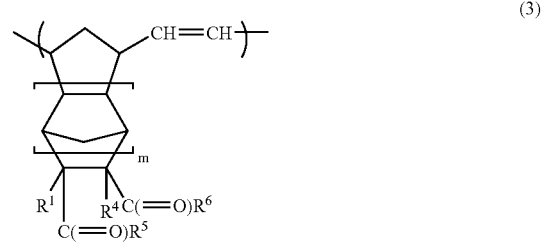

(3)

wherein $R^1$, $R^4$, $R^5$, $R^6$ and m are the same as defined above, and the group of the formula: $C(=O)R^5$ and the group of the formula: $C(=O)R^6$ are in the trans position, and (C) a repeating unit represented by the formula (4),

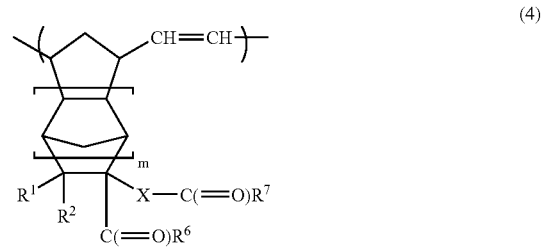

(4)

wherein $R^1$, $R^2$, $R^6$, $R^7$, X, and m are the same as defined above.

In the norbornene ring-opened polymer of the present invention, the repeating units represented by the formula (4) more preferably comprises the repeating units possessing the group of the formula: $C(=O)R^6$ in the exo position in an amount of 70 mol % or more.

Second, the present invention provides a process for producing the norbornene ring-opened polymer, comprising polymerizing a norbornene monomer by ring-opening metathesis polymerization, in the presence of a metathesis polymerization catalyst, the norbornene monomer having the formula (5):

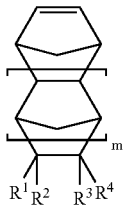

(5)

wherein $R^1$–$R^4$ and m are the same as defined above.

In the process for producing the norbornene ring-opened polymer of the present invention, the metathesis polymerization catalyst is preferably a ruthenium-carbene complex catalyst.

In the process for producing the norbornene ring-opened polymer of the present invention, the norbornene monomer of the formula (5) is preferably any one of the following monomers (a)–(c):

(a) a monomer of the formula (6),

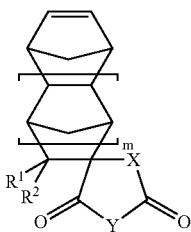

(6)

wherein $R^1$, $R^2$, X, Y, and m are the same as defined above, (b) a monomer of the formula (7),

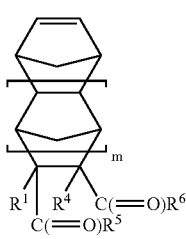

(7)

wherein $R^1$, $R^4$, $R^5$, $R^6$ and m are the same as defined above, and the group of the formula: $C(=O)R^5$ and the group of the formula: $C(=O)R^6$ are in the trans position, and (c) a monomer of the formula (8),

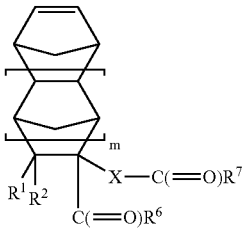

(8)

wherein $R^1$, $R^2$, $R^6$, $R^7$, X, and m are the same as defined above.

In the process for producing the norbornene ring-opened polymer of the present invention, the norbornene monomer of the formula (8) more preferably comprises the monomer possessing the group of the formula: $C(=O)R^6$ in the exo position in an amount of 70 mol % or more.

Third, the present invention provides a hydrogenated product of a norbornene ring-opened polymer obtained by hydrogenation of carbon-carbon double bonds in the norbornene ring-opened polymer of the present invention, in which 50% or more of the double bonds are hydrogenated.

Fourth, the present invention provides a process for producing a hydrogenated product of a norbornene ring-opened polymer, comprising hydrogenation of carbon-carbon double bonds in the norbornene ring-opened polymer of the present invention in the presence of a hydrogenation catalyst.

BEST MODE FOR CARRYING OUT THE INVENTION

The present invention will be described in detail below in the following sections: 1) norbornene ring-opened polymer, 2) process for producing the norbornene ring-opened polymer, and 3) hydrogenated norbornene ring-opened polymer and process for producing the same.

1) Norbornene Ring-opened Polymer

The norbornene ring-opened polymer of the present invention is a norbornene ring-opened polymer having a repeating unit represented by the formula (1), and has a weight average molecular weight determined by gel permeation chromatography of 1,000–1,000,000.

In the formula (1), $R^1$ represents Q, $R^2$ represents Q or $C(=O)R^5$, $R^3$ represents Q or $C(=O)R^6$, and $R^4$ represents Q or X—$C(=O)R^7$.

When $R^2$ is Q, $R^3$ is $C(=O)R^6$ and $R^4$ is X—$C(=O)R^7$. When $R^4$ is Q, $R^2$ is $C(=O)R^5$, $R^3$ is $C(=O)R^6$, and $R^2$ and $R^3$ are in the trans position.

m represents 0 or 1.

Here, Q represents a hydrogen atom or a hydrocarbon group having 1–10 carbon atoms which may be substituted with a hetero atom-containing functional group or a halogen atom.

Examples of the hydrocarbon group having 1–10 carbon atoms which may be substituted with a hetero atom-containing functional group or a halogen atom include hydrocarbon groups such as an alkyl group having 1–10 carbon atoms, a cycloalkyl group having 3–8 carbon atoms, and a substituted or unsubstituted phenyl group.

The hetero atom is an atom of the Group XV or XVI in the Periodic Table. Examples of the hetero atom include N, O, P, S, As, and Se. Examples of the halogen atom include F, Cl, Br, and I.

Specific examples of the alkyl group having 1–10 carbon atoms which may be substituted with a hetero atom-containing functional group or a halogen atom include alkyl groups having 1–10 carbon atoms such as a methyl group, ethyl group, n-propyl group, isopropyl group, n-butyl group, isobutyl group, sec-butyl group, t-butyl group, n-pentyl group, neopentyl group, n-hexyl group, isohexyl group, n-heptyl group, n-octyl group, n-nonyl group, and n-decyl group; alkyl groups having 1–10 carbon atoms substituted with a functional group containing an oxygen atom such as a methoxymethyl group, ethoxymethyl group, 2-methoxyethyl group, 3-methoxypropyl group, and 4-methoxybutyl group; alkyl groups having 1–10 carbon atoms substituted with a functional group containing a sulfur atom such as a methylthiomethyl group, ethylthiomethyl group, 2-methylthioethyl group, 3-methylthiopropyl group, and 4-methylthiobutyl group; alkyl groups having 1–10 carbon atoms substituted with a functional group containing a nitrogen atom such as a dimethylaminomethyl group, diethylaminomethyl group, and 2-dimethylaminoethyl group; and alkyl groups having 1–10 carbon atoms substituted with a halogen atom such as a fluoromethyl group, chloromethyl group, bromomethyl group, difluoromethyl group, dichloromethyl group, difluoromethyl group, trifluoromethyl group, trichloromethyl group, 2,2,2-trifluoroethyl group, pentafluoroethyl group, heptafluoropropyl group, perfluorobutyl group, and perfluoropentyl group.

Specific examples of the cycloalkyl group having 3–8 carbon atoms which may be substituted with a hetero atom-containing functional group or a halogen atom include a cyclopropyl group, 2-chlorocyclopropyl group, 2-methylcyclopropyl group, cyclopentyl group, 2-methylcyclopentyl group, 3-fluorocyclopentyl group, 3-methoxycyclopentyl group, cyclohexyl group, 4-methylcyclohexyl group, and 4-chlorocyclohexyl group.

Specific examples of the phenyl group which may be substituted with a hetero atom-containing functional group or a halogen atom include a phenyl group, 4-methylphenyl group, 4-chlorophenyl group, 2-chlorophenyl group, 3-methoxyphenyl group, and 2,4-dimethylphenyl group.

$R^5$, $R^6$, and $R^7$ individually represent a hydroxyl group or an alkoxyl group having 1–10 carbon atoms which may be substituted with a hetero atom-containing functional group or a halogen atom.

Examples of the alkoxyl group having 1–10 carbon atoms which may be substituted with a hetero atom-containing functional group or a halogen atom include alkoxyl groups such as a methoxy group, ethoxy group, n-propoxy group, n-butoxy group, and t-butoxy group. As examples of the hetero atom-containing functional group and the halogen atom, the same hydrocarbon group having 1–10 carbon atoms which may be substituted with a hetero atom-containing functional group or a halogen atom given as examples for Q can be given.

$R^6$ and $R^7$ may be bonded together to form an oxygen atom, a sulfur atom, or $NR^8$.

Here, $R^8$ represents a hydrogen atom, a hydroxyl group, a substituted or unsubstituted hydrocarbon group having 1–10 carbon atoms, an alkoxyl group having 1–10 carbon atoms, or an alkoxycarbonyl group having 1–10 carbon atoms.

Examples of the hydrocarbon group having 1–10 carbon atoms include alkyl groups such as a methyl group, ethyl group, n-propyl group, isopropyl group, n-butyl group, sec-butyl group, isobutyl group, t-butyl group, n-pentyl group, n-hexyl group, n-heptyl group, n-octyl group, n-nonyl group, and n-decyl group; cycloalkyl groups such as a cyclopropyl group, cyclopentyl group, and cyclohexyl group; and aromatic hydrocarbon groups such as a phenyl group, 4-methylphenyl group, 2,4,6-trimethylphenyl group, and naphthyl group.

Examples of a substituent for the substituted or unsubstituted hydrocarbon group having 1–10 carbon atoms include an alkoxycarbonyl group, alkoxyl group, substituted or unsubstituted phenyl group, halogen atom, alkylthio group, hydroxyl group, mercapto group, amino group, carboxyl group, cyano group, nitro group, and a group of $C(=O)NH_2$. The hydrocarbon group having 1–10 carbon atoms may have these substituents in any position, and may be substituted with two or more of the same or different substituents.

Examples of the alkoxyl group having 1–10 carbon atoms include a methoxy group, ethoxy group, n-propoxy group, isopropoxy group, n-butoxy group, and t-butoxy group.

Examples of the alkoxycarbonyl group having 1–10 carbon atoms include a methoxycarbonyl group, ethoxycarbonyl group, n-propoxycarbonyl group, isopropoxycarbonyl group, n-butoxycarbonyl group, and t-butoxycarbonyl group.

Of these, $R^8$ is preferably a hydrogen atom, a hydroxyl group, an alkyl group having 1–10 carbon atoms, or a group of the formula: $CH(r^1)CO_2r^2$.

In the formula, $r^1$ represents a hydrogen atom; a substituted or unsubstituted alkyl group such as a methyl group, ethyl group, n-propyl group, isopropyl group, n-butyl group, isobutyl group, sec-butyl group, hydroxymethyl group, 1-hydroxyethyl group, 2-carboxyethyl group, 3-carboxypropyl group, 2-amidoethyl group, 3-amidopropyl group, 2-mercaptoethyl group, 3-methylthiopropyl group, or 5-aminopentyl group; a substituted or unsubstituted phenyl group such as a phenyl group; a substituted or unsubstituted aralkyl group such as a benzyl group or 4-hydroxybenzyl group; or the like. $r^2$ represents a hydrogen atom or an alkyl group such as a methyl group or ethyl group.

X represents a substituted or unsubstituted alkylene group having 1–5 carbon atoms.

Specifically, the substituted or unsubstituted alkylene group having 1–5 carbon atoms is a group of the formula: $(Cr^3r^4)_n$. There are no specific limitations to $r^3$ and $r^4$ in the formula, insofar as $r^3$ and $r^4$ are groups that bond to the carbon atom and are inactive in the ring-opening polymerization reaction of the norbornene monomer. Examples of $r^3$ and $r^4$ include a hydrogen atom, an alkyl group having 1–6 carbon atoms, an alkyl group having 1–6 carbon atoms substituted with a halogen atom, an alkyl group having 1–6 carbon atoms substituted with an alkoxyl group, an alkyl group having 1–6 carbon atoms substituted with an alkylthio group, an alkyl group having 1–6 carbon atoms substituted with an amino group or substituted amino group, an alkoxyl group having 1–6 carbon atoms, a halogen atom, and a substituted or unsubstitutedphenyl group. Of these, $r^3$ and $r^4$ are preferably a hydrogen atom or an alkyl group having 1–6 carbon atoms, and particularly preferably both $r^3$ and $r^4$ are hydrogen atoms, due to easy availability, high polymerization reactivity, and the like.

n represents an integer of 1–5, preferably 3 or less, and more preferably 1. When n is two or more, the groups of the formula: $Cr^3r^4$ may be the same or different.

In the norbornene ring-opened polymer of the present invention, the repeating unit represented by the formula (1) is preferably any one of the following repeating units (A)–(C)

(A) A Repeating Unit Represented by the Formula (2)

In the formula (2), $R^1$, $R^2$, X, and m are the same as defined above. Y represents an oxygen atom, a sulfur atom, or $NR^8$, wherein $R^8$ is the same as defined above.

In the present invention, in the repeating unit represented by the formula (2), $R^1$ and $R^2$ are preferably a hydrogen atom or an unsubstituted alkyl group having 1–10 carbon atoms, and particularly preferably both $R^1$ and $R^2$ are hydrogen atoms, due to easy availability of the raw material, high polymerization reactivity, and the like. $R^5$ is preferably a hydroxyl group or an alkoxyl group such as a methoxy group or ethoxy group. $r^3$ and $r^4$ are preferably a hydrogen atom or an alkyl group having 1–6 carbon atoms, and particularly preferably both $r^3$ and $r^4$ are hydrogen atoms.

In addition, m is preferably 0, because the raw material can be easily synthesized and purified, and the target ring-opened polymer can be efficiently obtained, for example.

(B) A Repeating Unit Represented by the Formula (3)

In the formula (3), $R^1$, $R^4$, $R^5$, $R^6$, and m are the same as defined above.

In the present invention, in the repeating unit represented by the formula (3), $R^1$ and $R^4$ are preferably a hydrogen atom or an unsubstituted alkyl group having 1–10 carbon atoms respectively, and particularly preferably both $R^1$ and $R^4$ are hydrogen atoms, due to easy availability of the raw material, high polymerization reactivity, and the like. $R^5$ and $R^6$ are preferably a hydroxyl group or an unsubstituted alkoxyl group having 1–10 carbon atoms, more preferably at least one of $R^5$ and $R^6$ is a hydroxyl group, and particularly preferably both $R^5$ and $R^6$ are hydroxyl groups. In addition, m is preferably 0, because the raw material can be easily synthesized and purified, and the target ring-opened polymer can be efficiently obtained, for example.

In the formula (3), the group of the formula: $C(=O)R^5$ and the group of the formula: $C(=O)R^6$ are in the trans position with respect to one another.

(C) A Repeating Unit Represented by the Formula (4)

In the formula (4), $R^1$, $R^2$, $R^3$, $R^4$, X, and m are the same as defined above.

In the present invention, in the repeating unit represented by the formula (4), $R^1$ and $R^2$ are preferably a hydrogen atom or an unsubstituted alkyl group having 1–10 carbon atoms respectively, and particularly preferably both $R^1$ and $R^2$ are hydrogen atoms. $R^6$ and $R^7$ are preferably a hydroxyl group or an unsubstituted alkoxyl group having 1–10 carbon atoms, more preferably a hydroxyl group or an unsubstituted alkoxyl group having 1–10 carbon atoms, wherein at least one of $R^6$ and $R^7$ is a hydroxyl group, and particularly preferably both $R^6$ and $R^7$ are hydroxyl groups. In addition, m is preferably 0, because the raw material can be synthesized and purified easily, and the target ring-opened polymer can be efficiently obtained and the like.

The repeating units represented by the formula (4) more preferably comprises the repeating units possessing the group of the formula: $C(=O)R^6$ in the exo position in an amount of 70 mol % or more.

The ratio of the repeating unit derived from the norbornene monomer of the present invention to the total repeating units may be optionally selected according to the purpose of manufacturing the polymer. However, the ratio is preferably 1–90%, and more preferably 1–80%, taking the balance among heat resistance, electric characteristics, low water absorption and adhesion, and compatibility into consideration.

The ratio of the repeating unit represented by the formula (1) contained in the norbornene ring-opened polymer to the total repeating units can be determined by measuring the $^1$H-NMR spectrum of the resulting ring-opened polymer, for example.

The weight average molecular weight of the norbornene ring-opened polymer of the present invention is not specifically limited, but is usually 1,000–1,000,000, preferably 3,000–500,000, and more preferably 5,000–50,000. The weight average molecular weight (Mw) of the ring-opened polymer is determined by gel permeation chromatography (GPC) and expressed in terms of polystyrene.

2) Process for Producing Norbornene Ring-opened Polymer

The process for producing the norbornene ring-opened polymer of the present invention comprises polymerizing a norbornene monomer of the formula (5) by ring-opening metathesis polymerization in the presence of a metathesis polymerization catalyst.

(1) Metathesis Polymerization Catalyst

The metathesis polymerization catalyst may be any catalyst that is a transition metal compound of the Groups IV–VIII of the Periodic Table and can perform polymerization of a norbornene monomer of the formula (5) by ring-opening metathesis polymerization. For example, catalysts described in "Olefin Metathesis and Metathesis Polymerization (K. J. Ivin and J. C. Mol, Academic Press, San Diego, 1997)" may be used.

Examples of the metathesis polymerization catalyst include (i) a ring-opening metathesis polymerization catalyst in which a transition metal halide and a co-catalyst are combined, (ii) Groups IV–VIII transition metal-carbene complex catalyst, and (iii) metallacyclobutane complex catalyst. These metathesis polymerization catalysts may be used individually or in a mixture of two or more. Of these, (ii) the Groups IV–VIII transition metal-carbene complex catalyst is preferably used, and a ruthenium-carbene complex catalyst is particularly preferably used, because such a catalyst does not require a co-catalyst and is highly active.

Specific examples of the transition metal halide in the catalyst (i) include molybdenum halides such as $MoBr_2$, $MoBr_3$, $MoBr_4$, $MoCl_4$, $MoCl_5$, $MoF_4$, $MoOCl_4$, and $MoOF_4$; tungsten halides such as $WBr_2$, $WCl_2$, $WBr_4$, $WCl_4$, $WCl_5$, $WCl_6$, $WF_4$, $WI_2$, $WOBr_4$, $WOCl_4$, $WOF_4$, and $WCl_4(OC_6H_4Cl_2)_2$; vanadium halides such as $VOCl_3$ and $VOBr_3$; and titanium halides such as $TiCl_4$ and $TiBr_4$.

Specific examples of the co-catalyst include organoaluminum compounds such as trimethylaluminum, triethylaluminum, triisobutylaluminum, trihexylaluminum, trioctylaluminum, triphenylaluminum, tribenzylaluminum, diethylaluminum monochloride, di-n-butylaluminum monochloride, diethylaluminum monoiodide, diethylaluminum monohydride, ethylaluminum sesquichloride, ethylaluminum dichloride, methylalumioxane, and isobutylaluminoxane; organotin compounds such as tetramethyltin, diethyldimethyltin, tetraethyltin, dibutyldiethyltin, tetrabutyltin, tetraoctyltin, trioctyltin fluoride, trioctyltin chloride, trioctyltin bromide, trioctyltin iodide, dibutyltin difluoride, dibutyltin dichloride, dibutyltin dibromide, dibutyltin diodide, butyltin trifluoride, butyltin trichloride, butyltin tribromide, and dibutyltin triiodide; organolithium compounds such as methyl lithium, ethyl lithium, n-butyl lithium, sec-butyl lithium, and phenyl lithium; organosodium compounds such as n-pentylsodium; organomagnesium compounds such as methylmagnesium iodide, ethylmagnesium bromide, methylmagnesium bromide, n-propylmagnesium bromide, t-butylmagnesium chloride, and arylmagnesium chloride; organozinc compounds such as diethylzinc; organocadmium compounds such as diethylcadmium; and organoboron compounds such as trimethylboron, triethylboron, tri-n-butylboron, triphenylboron, tris(perfluorophenyl)boron, N,N-dimethylanilinium tetrakis(perfluorophenyl)borate, and trityl tetrakis(perfluorophenyl)borate.

Examples of the Groups IV–VIII transition metal-carbene complex catalyst include a tungsten-alkylidene complex catalyst, a molybdenum-alkylidene complex catalyst, a rhenium-alkylidene complex catalyst, and a ruthenium-carbene complex catalyst.

Specific examples of the tungsten-alkylidene complex catalyst include W(N-2,6-Pr$^i_2$C$_6$H$_3$)(CHBu$^t$)(OBu$^t$)$_2$, W(N-2,6-Pr$^i_2$C$_6$H$_3$)(CHBu$^t$)(OCMe$_2$CF$_3$)$_2$, W(N-2,6-Pr$^i_2$C$_6$H$_3$)(CHBu$^t$)(OCMe(CF$_3$)$_2$)$_2$, W(N-2,6-Pr$^i_2$C$_6$H$_3$)(CHCMe$_2$Ph)(OBu$^t$)$_2$, W(N-2,6-Pr$^i_2$C$_6$H$_3$)(CHCMe$_2$Ph)(OCMe$_2$CF$_3$)$_2$, and W(N-2,6-Pr$^i_2$C$_6$H$_3$)(CHCMe$_2$Ph)(OCMe(CF$_3$)$_2$)$_2$.

Specific examples of the molybdenum-alkylidene complex catalyst include Mo(N-2,6-Pr$^i_2$C$_6$H$_3$)(CHBu$^t$)(OBu$^t$)$_2$, Mo(N-2,6-Pr$^i_2$C$_6$H$_3$)(CHBu$^t$)(OCMe$_2$CF$_3$)$_2$, Mo(N-2,6-Pr$^i_2$C$_6$H$_3$)(CHBu$^t$)(OCMe (CF$_3$)$_2$)$_2$, Mo(N-2,6-Pr$^i_2$C$_6$H$_3$)(CHCMe$_2$Ph)(OBu$^t$)$_2$, Mo(N-2,6-Pr$^i_2$C$_6$H$_3$)(CHCMe$_2$Ph)(OCMe$_2$CF$_3$)$_2$, Mo(N-2,6-Pr$^i_2$C$_6$H$_3$)(CHCMe$_2$Ph)(OCMe(CF$_3$)$_2$)$_2$, Mo(N-2,6-Pr$^i_2$C$_6$H$_3$)(CHCMe$_2$Ph)(BIPHEN), and Mo(N-2,6-Pr$^i_2$C$_6$H$_3$)(CHCMe$_2$Ph)(BINO)(THF).

Specific examples of the rhenium-alkylidene complex catalyst include Re(CBu$^t$)(CHBu$^t$)(O-2,6-Pr$^i_2$C$_6$H$_3$)$_2$, Re(CBu$^t$)(CHBu$^t$)(O-2-Bu$^t$C$_6$H$_4$)$_2$, Re(CBu$^t$)(CHBu$^t$)(OCMe$_2$CF$_3$)$_2$, Re(CBu$^t$)(CHBu$^t$)(OCMe(CF$_3$)$_2$)$_2$, and Re(CBu$^t$)(CHBu$^t$)(O-2,6-Me$_2$C$_6$H$_3$)$_2$.

In the above formulas, Pr$^i$ represents an isopropyl group, Bu$^t$ represents a t-butyl group, Me represents a methyl group, Ph represents a phenyl group, BIPHEN represents a 5,5',6,6'-tetramethyl-3,3'-di-t-butyl-1,1'-biphenyl-2,2'-dioxy group, BINO represents a 1,1'-dinaphthyl-2,2'-dioxy group, and THF represents tetrahydrofuran.

Specific examples of the ruthenium-carbene complex catalyst include a compound of the following formula (I) or (II).

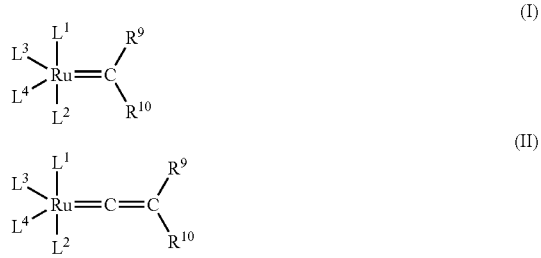

In the formulas (I) and (II), =CR$^9$R$^{10}$ and =C=CR$^9$R$^{10}$ are carbene compounds containing carbene carbon as the reaction center. R$^9$ and R$^{10}$ individually represent a hydrogen atom or a hydrocarbon group having 1–20 carbon atoms which may contain a halogen atom, oxygen atom, nitrogen atom, sulfur atom, phosphorus atom, or silicon atom. These carbene compounds may or may not contain a hetero atom. L$^1$ represents a hetero atom-containing carbene compound, and L$^2$ represents a hetero atom-containing carbene compound or a neutral electron-donating compound.

Here, the hetero atom-containing carbene compound refers to a compound containing carbene carbon and a hetero atom. Either both L$^1$ and L$^2$ are hetero atom-containing carbene compounds, or only L$^1$ is a hetero atom-containing carbene compound. A metal ruthenium atom directly bonds to the carbene carbon contained in the carbene compound and a group containing a hetero atom bonds to the carbene carbon.

L$^3$ and L$^4$ individually represent an anionic ligand. Two, three, four, five, or six of R$^9$, R$^{10}$, L$^1$, L$^2$, L$^3$, and L$^4$ may be bonded together to form a multidentate chelating ligand. Examples of the hetero atom include N, O, P, S, As, and Se. Of these, N, O, P, S, and the like are preferable, and N is particularly preferable, because a stable carbene compound can be obtained.

In the formulas (I) and (II), the anionic ligands L$^3$ and L$^4$ are ligands having negative charges when separated from the central metal. Examples of the ligands include halogen atoms such as a fluorine atom, chlorine atom, bromine atom, and iodine atom; hydrocarbon groups containing oxygen, such as a diketonate group, alkoxy group, aryloxy group, and carboxyl group; and alicyclic hydrocarbon groups substituted with a halogen atom such as a chlorocyclopentadienyl group. Of these, halogen atoms are preferable, and a chlorine atom is more preferable.

When L$^2$ is a neutral electron-donating compound, L$^2$ may be any ligand having a neutral charge when separated from the central metal. Specific examples of the ligand include carbonyls, amines, pyridines, ethers, nitrites, esters, phosphines, thioethers, aromatic compounds, olefins, isocyanides, and thiocyanates. Of these, phosphines and pyridines are preferable, and trialkylphosphine is more preferable.

Examples of the complex compound of the formula (I) include ruthenium complex compounds in which a hetero atom-containing caben compound and a neutral electron-donating compound are bonded such as benzylidene(1,3-dimesitylimidazolydin-2-ylidene)(tricyclohexylphosphine)ruthenium dichloride, (1,3-dimesitylimidazolydin-2-ylidene)(3-methyl-2-buten-1-ylidene) (tricyclopentylphosphine)ruthenium dichloride, benzylidene (1,3-dimesityl-octahydrobenzimidazol-2-ylidene) (tricyclohexylphosphine)ruthenium dichloride, benzylidene [1,3-di(1-phenylethyl)-4-imidazolin-2-ylidene] (tricyclohexylphosphine)ruthenium dichloride, benzylidene (1,3-dimesityl-2,3-dihydrobenzimidazol-2-ylidene) (tricyclohexylphosphine)ruthenium dichloride, benzylidene (tricyclohexylphosphine)(1,3,4-triphenyl-2,3,4,5-tetrahydro-1H-1,2,4-triazol-5-ylidene)ruthenium dichloride, (1,3-diisopropylhexahydropyrimidin-2-ylidene)(ethoxymethylene)(tricyclohexylphosphine)ruthenium dichloride, benzylidene(1,3-dimesitylimidazolydin-2-ylidene)pyridineruthenium dichloride, (1,3-dimesitylimidazolydin-2-ylidene)(2-phenylethylidene)(tricyclohexylphosphine)ruthenium dichloride, and (1,3-dimesityl-4-imidazolin-2-ylidene)(2-phenylethylidene)(tricyclohexylphosphine) ruthenium dichloride; ruthenium compounds in which two neutral electron-donating compounds are bonded such as benzylidenebis(tricyclohexylphosphine)ruthenium dichloride and (3-methyl-2-buten-1-ylidene)bis(tricyclopentylphosphine)ruthenium dichloride; and ruthenium complex compounds in which two hetero atom-containing carbene compounds are bonded such as benzylidenebis(1,3-dicyclohexylimidazolydin-2-ylidene)ruthenium dichloride and benzylidenebis(1,3-diisopropyl-4-imidazolin-2-ylidene)ruthenium dichloride.

Examples of the complex compound of the formula (II) include (1,3-dimesitylimidazolydin-2-ylidene)(phenylvinylidene)(tricyclohexylphosphine)ruthenium dichloride, (t-butylvinylidene)(1,3-diisopropyl-4-imidazolin-2-ylidene) (tricyclopentylphosphine)ruthenium dichloride, and bis(1,3-dicyclohexyl-4-imidazolin-2-ylidene)phenylvinylideneruthenium dichloride.

These ruthenium complex catalysts can be produced by the methods described in Org. Lett., 1999, Vol. 1, p. 953 and Tetrahedron Lett., 1999, Vol. 40, p. 2247, for example.

The metathesis polymerization catalyst is used at a molar ratio of the catalyst to the monomers of 1:100 to 1:2,000,000, preferably 1:500 to 1:1,000,000, and more preferably 1:1,000 to 1:500,000. If the catalyst is used at a molar ratio above this range, it may be difficult to remove the catalyst. If the catalyst is used at a molar ratio below this range, the resulting polymerization activity may be insufficient.

(2) Norbornene Monomer

The process for producing the norbornene ring-opened polymer of the present invention comprises ring-opening metathesis polymerization of a norbornene monomer of the formula (5).

In the production process of the present invention, the norbornene monomer of the formula (5) is preferably any one of the following monomers (a)–(c).

(a) A Monomer of the Formula (6)

Specific examples of the norbornene monomer of the formula (6), wherein m is 0, include a cyclopentadiene-itaconic anhydride addition product, a cyclopentadiene-itaconimide addition product, a cyclopentadiene-N-methylitaconimide addition product, a cyclopentadiene-N-ethylitaconimide addition product, a cyclopentadiene-N-phenylitaconimide addition product, a cyclopentadiene-N-hydroxyitaconimide addition product, a cyclopentadiene-2-itaconimidoacetic acid addition product, a cyclopentadiene-3-itaconimidopropionic acid addition product, a cyclopentadiene-N-methoxycarbonylmethylitaconimide addition product, a cyclopentadiene-N-ethoxycarbonylmethylitaconimide addition product, and a cyclopentadiene-N-(1-ethoxycarbonyl)ethylimide addition product.

As the compound of the formula (6), wherein m is 1, tetracyclododecenes in which cyclopentadiene is further added to the above norbornene monomer can be given.

(b) A Monomer of the Formula (7)

In the compound of the formula (7), the group of the formula: $C(=O)R^5$ and the group of the formula: $C(=O)R^6$ are in the trans position with respect to one another. Such a norbornene monomer having a specific configuration has high polymerization reactivity. Therefore, even if either the $C(=O)R^5$ group or the $C(=O)R^6$ group is a carboxyl group or both of these groups are carboxyl groups in the norbornene monomer used, the target norbornene ring-opened polymer can be efficiently obtained.

Specific examples of the norbornene monomer of the formula (7), wherein m is 0, include norbornene monomers having two carboxyl groups such as 5-endo-6-exo-dicarboxy-2-norbornene, 5-methyl-5-endo-6-exo-dicarboxy-2-norbornene, and 5,6-dimethyl-5-endo-6-exo-dicarboxy-2-norbornene; norbornene monomers having one carboxyl group and one ester group such as 5-endo-carboxy-6-exo-methoxycarbonyl-2-norbornene, 5-endo-carboxy-6-exo-ethoxycarbonyl-2-norbornene, 5-endo-carboxy-6-exo-n-propoxycarbonyl-2-norbornene, 5-endo-carboxy-6-exo-isopropoxycarbonyl-2-norbornene, 5-endo-carboxy-6-exo-n-butoxycarbonyl-2-norbornene, 5-endo-carboxy-6-exo-t-butoxycarbonyl-2-norbornene, 5-endo-carboxy-6-exo-methoxymethoxycarbonyl-2-norbornene, 5-endo-carboxy-6-exo-methylthiomethoxycarbonyl-2-norbornene, 5-endo-carboxy-6-exo-dimethylaminomethoxycarbonyl-2-norbornene, 5-endo-carboxy-6-exo-trifluoromethoxycarbonyl-2-norbornene, 5-endo-carboxy-6-exo-cyclopentyloxycarbonyl-2-norbornene, 5-endo-carboxy-6-exo-phenoxycarbonyl-2-norbornene, 5-endo-carboxy-6-exo-benzyloxycarbonyl-2-norbornene, and compounds having a configuration of the substituents at the 5-position and the 6-position reverse to the configuration in these compounds; and norbornene monomers having two ester groups such as 5-endo-6-exo-dimethoxycarbonyl-2-norbornene, 5-endo-6-exo-diethoxycarbonyl-2-norbornene, 5-endo-methoxycarbonyl-6-exo-ethoxycarbonyl-2-norbornene, 5-endo-methoxycarbonyl-6-exo-t-butoxycarbonyl-2-norbornene, 5-endo-6-exo-di(n-propoxycarbonyl)-2-norbornene, 5-endo-6-exo-diisopropoxycarbonyl-2-norbornene, 5-endo-6-exo-di(n-butoxycarbonyl)-2-norbornene, 5-endo-6-exo-di(t-butoxycarbonyl)-2-norbornene, 5-endo-6-exo-di(methoxymethoxycarbonyl)-2-norbornene, 5-endo-6-exo-di(methylthiomethoxycarbonyl)-2-norbornene, 5-endo-6-exo-di(dimethylaminomethoxycarbonyl)-2-norbornene, 5-endo-6-exo-di(trifluoromethoxycarbonyl)-2-norbornene, 5-endo-6-exo-dicyclopentyloxycarbonyl-2-norbornene, and 5-endo-6-exo-diphenoxycarbonyl-2-norbornene.

As the compound of the formula (7), wherein m is 1, tetracyclododecenes in which cyclopentadiene is further added to the above norbornene monomer can be given.

(c) A Monomer of the Formula (8)

Examples of the norbornene monomer of the formula (8), wherein m is 0, include norbornenes having two carboxylic acid groups such as 5-carboxy-5-carboxymethyl-2-norbornene, 5-carboxy-5-(2'-carboxy)ethyl-2-norbornene, 5-carboxy-5-(3'-carboxy)propyl-2-norbornene, and 5-carboxy-5-carboxymethyl-6-methyl-2-norbornene; norbornenes having a carboxylic acid group and an ester group such as 5-carboxy-5-methoxycarbonylmethyl-2-norbornene, 5-carboxy-5-ethoxycarbonylmethyl-2-norbornene, 5-carboxy-5-n-propoxycarbonylmethyl-2-norbornene, 5-carboxy-5-isopropoxycarbonylmethyl-2-norbornene, 5-carboxy-5-n-butoxycarbonylmethyl-2-norbornene, 5-carboxy-5-t-butoxycarbonylmethyl-3-norbornene, 5-carboxy-5-(2'-methoxycarbonyl)ethyl-2-norbornene, 5-carboxy-5-(2'-ethoxycarbonyl)ethyl-2-norbornene, 5-carboxy-5-(3'-methoxycarbonyl)propyl-2-norbornene, 5-methoxycarbonyl-5-carboxymethyl-2-norbornene, 5-ethoxycarbonyl-5-carboxymethyl-2-norbornene, 5-n-propoxycarbonyl-5-carboxymethyl-2-norbornene, 5-isopropoxycarbonyl-5-carboxymethyl-2-norbornene, 5-n-butoxycarbonyl-5-carboxymethyl-2-norbornene, 5-t-butoxycarbonyl-5-carboxymethyl-2-norbornene, 5-methoxycarbonyl-5-(2'-carboxy)ethyl-2-norbornene, 5-ethoxycarbonyl-5-(2'-carboxy)ethyl-2-norbornene, 5-methoxycarbonyl-5-(3'-carboxy)propyl-2-norbornene, 5-ethoxycarbonyl-5-(2'-carboxy)propyl-2-norbornene, and 5-methoxycarbonyl-5-(4'-carboxy)butyl-2-norbornene; and norbornenes having two ester groups such as 5-methoxycarbonyl-5-methoxycarbonylmethyl-2-norbornene, 5-ethoxycarbonyl-5-methoxycarbonylmethyl-2-norbornene, 5-methoxycarbonyl-5-ethoxycarbonylmethyl-2-norbornene, 5-ethoxycarbonyl-5-ethoxycarbonylmethyl-2-norbornene, 5-n-propoxycarbonyl-5-methoxycarbonylmethyl-2-norbornene, 5-isopropoxycarbonyl-5-methoxycarbonylmethyl-2-norbornene, 5-n-butoxycarbonyl-5-methoxycarbonylmethyl-2-norbornene, 5-t-butoxycarbonyl-5-methoxycarbonylmethyl-2-norbornene, 5-methoxycarbonyl-5-(2'-methoxycarbonyl)ethyl-2-norbornene, 5-ethoxycarbonyl-5-(2'-methoxycarbonyl)ethyl-2-norbornene, 5-methoxycarbonyl-5-(2'-ethoxycarbonyl)ethyl-2-norbornene, 5-ethoxycarbonyl-5-(2'-ethoxycarbonyl)ethyl-2-norbornene, 5-methoxycarbonyl-5-

(3'-methoxycarbonyl)propyl-2-norbornene, 5-ethoxycarbonyl-5-(3'-methoxycarbonyl)propyl-2-norbornene, and 5-methoxycarbonyl-5-(4'-methoxycarbonyl)butyl-2-norbornene.

As the compound of the formula (8), wherein m is 1, tetracyclododecenes in which cyclopentadiene is further added to the above norbornene monomer can be given.

In the present invention, the norbornene monomer of the formula (8) preferably comprises the monomer possessing the group of the formula: C(=O)R$^6$ in the exo position in an amount of 70 mol % or more, and preferably 80 mol % or more.

(3) Production of Norbornene Monomer

The norbornene monomer of the formula (5) can be prepared easily, for example, in the following manner:

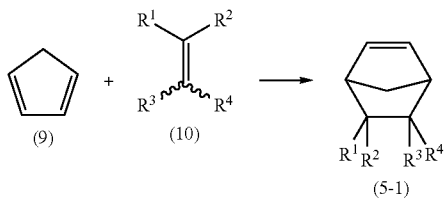

wherein R$^1$–R$^4$ are the same as defined above.

Namely, a norbornene monomer (5-1) as the norbornene monomer of the formula (5), wherein m is 0, can be obtained by Diels-Alder addition reaction of cyclopentadiene (9) with an olefin compound (10).

Specific examples of the compound of the formula (10) include, but are not limited to, itaconic acid; itaconates such as monomethyl itaconate, dimethyl itaconate, monoethyl itaconate, and diethyl itaconate; itaconic anhydride; itaconimides such as itaconimide (3-methylenesuccinimide) and N-methylitaconimide (1-methyl-3-methylenesuccinimide); fumaric acid; and fumarates such as monomethyl fumarate, dimethyl fumarate, monoethyl fumarate, and diethyl fumarate.

Tetracyclododecenes (5-2), a norbornene monomer of the formula (5), wherein m is 1, can be obtained by Diels-Alder addition reaction of the norbornene monomer (5-1) with cyclopentadiene (9) of the following reaction formula.

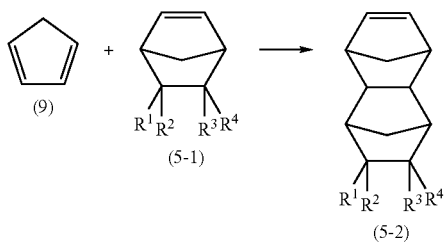

When the norbornene monomer of the formula (8) is produced using this reaction, the norbornene monomer comprising the monomer possessing the group of the formula: C(=O)R$^6$ in the exo position in an amount of 70 mol % or more, and preferably 80 mol % or more can be easily obtained.

In these reactions, the target norbornene monomer of the formula (5-1) or (5-2) can be efficiently separated by purifying the reaction solution using a conventional separation and purification means such as distillation, column chromatography, or recrystallization after the reaction.

The production process of the present invention may be (α) homopolymerization of one norbornene monomer of the formula (5), (β) copolymerization of two or more norbornene monomers of the formula (5), or (γ) copolymerization of at least one norbornene monomer of the formula (5) and the other monomers copolymerizable with the norbornene monomer.

Examples of the other monomers used in the process (γ) include norbornene monomers having no substituent or having a hydrocarbon group as a substituent such as 2-norbornene, 5-methyl-2-norbornene, 5-ethyl-2-norbornene, 5-ethylidene-2-norbornene, 5-phenyl-2-norbornene, 5-cyclohexyl-2-norbornene, 5-cyclohexenyl-2-norbornene, dicyclopentadiene, 1,4-methano-1,4,4a,9a-tetrahydrofluorene, tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene, and 8-ethylidenetetracyclo[4.4.0.1$^{2,5}$.1$^{7,10}$]-3-dodecene; monomers having a functional group such as 5-methoxycarbonyl-2-norbornene, 5-methyl-5-methoxycarbonyl-2-norbornene, 2-norbornene-5,6-dicarboxylic anhydride, 2-norbornene-5,6-dicarboxylic imide, 8-methoxycarbonyltetracyclo[4.4.0.1$^{2,5}$.1$^{7,10}$]-3-dodecene, and 8-methyl-8-methoxycarbonyltetracyclo[4.4.0.1$^{2,5}$.1$^{7,10}$]-3-dodecene; monocyclic olefins such as cyclopentene and cyclooctene; and cyclic diolefins such as cyclohexadiene, cycloheptadiene, and cyclooctadiene. Of these, norbornene monomers having no substituent or having a hydrocarbon group as the substituent are preferable, because a copolymer having a desired composition ratio and molecular weight can be easily obtained.

In the polymerization reaction, a molecular weight adjuster may be added to the reaction system in order to adjust the molecular weight of the polymer. As the molecular weight adjuster, a-olefins such as 1-butene, 1-pentene, 1-hexene, and 1-octene; styrenes such as styrene and vinyltoluene; halogen-containing vinyl compounds such as allyl chloride; oxygen-containing vinyl compounds such as ethyl vinyl ether, isobutyl vinyl ether, allyl glycidyl ether, allyl acetate, allyl alcohol, and glycidyl methacrylate; nitrogen-containing vinyl compounds such as acrylonitrile and acrylamide; and the like can be used. A polymer with a desired molecular weight can be obtained by using the molecular weight adjuster in an amount of 0.1–100 mol % of the norbornene monomer.

Ring-opening polymerization of the norbornene monomer using the metathesis polymerization catalyst can be carried out using or without using a solvent, preferably in an atmosphere of inert gas such as nitrogen gas or argon gas. If the resulting polymer is to be subjected to hydrogenation reaction as is without separation after the polymerization reaction, the polymerization reaction is preferably carried out in a solvent.

There are no specific limitations to the solvent used, insofar as the solvent allows the resulting polymer to be dissolved therein and does not hinder the polymerization reaction. Examples of the solvent include aliphatic hydrocarbons such as n-pentane, n-hexane, and n-heptane; alicyclic hydrocarbons such as cyclopentane, cyclohexane, methylcycdohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, xylene, and mesitylene; nitrogen-containing hydrocarbons such as nitromethane, nitrobenzene, acetonitrile, propionitrile, and benzonitrile; ethers such as diethyl ether, tetrahydrofuran, and dioxane; ketones such as acetone, ethyl methyl ketone, cyclopentanone, and cyclohexanone; esters such as methyl acetate, ethyl acetate, ethyl propionate, and methyl benzoate; and halogenated hydrocarbons such as chloroform, dichloromethane, 1,2-dichloroethane, chlorobenzene, dichlorobenzene, and trichlorobenzene. Of these, aromatic hydrocarbons, alicyclic hydrocarbons, ethers, ketones, or esters are preferably used.

The concentration of the norbornene monomer in the solvent is preferably 1–50 wt %, more preferably 2–45 wt %, and still more preferably 5–40 wt %. If the concentration of the norbornene monomer is less than 1 wt %, productivity of the polymer may be reduced. If more than 50 wt %, viscosity after polymerization may be too high, resulting in difficulty in hydrogenation after polymerization.

The metathesis polymerization catalyst may be added to the reaction system either as dissolved in a solvent or as is without dissolution. As the solvent for preparing the catalyst solution, the same solvents as used in the polymerization reaction can be given.

The polymerization temperature is not specifically limited, but is usually −100° C. to +200° C., preferably −50° C. to +180° C., more preferably −30° C. to +160° C., and still more preferably 0° C. to +140° C. The polymerization time is usually one minute to 100 hours, and can be appropriately controlled according to the progress of the reaction.

3) Hydrogenated Norbornene Ring-opened Polymer and Process for Producing the Same The hydrogenated norbornene ring-opened polymer of the present invention can be obtained by hydrogenating carbon-carbon double bonds in the norbornene ring-opened polymer of the present invention.

In the hydrogenated norbornene ring-opened polymer of the present invention, the percentage of hydrogenated carbon-carbon double bonds (hydrogenation rate) is usually 50% or more. From the viewpoint of heat resistance, the hydrogenation rate is preferably 70% or more, more preferably 80% or more, and still more preferably 90% or more.

The hydrogenation rate of the hydrogenated norbornene ring-opened polymer can be determined by comparing the peak strength derived from carbon-carbon double bonds of the norbornene ring-opened polymer in the $^1$H-NMR spectrum with the peak strength derived from carbon-carbon double bonds of the hydrogenated polymer in the $^1$H-NMR spectrum, for example.

Hydrogenation reaction of the norbornene ring-opened polymer can be carried out by converting carbon-carbon double bonds of the main chain of the norbornene ring-opened polymer into saturated single bonds using hydrogen gas in the presence of a hydrogenation catalyst.

As the hydrogenation catalyst, a catalyst conventionally used for hydrogenating an olefin compound such as a homogeneous catalyst or a heterogeneous catalyst can be appropriately used without any specific limitations.

Examples of the homogeneous catalyst include Ziegler catalysts comprising a combination of a transition metal compound and an alkali metal compound such as a combination of cobalt acetate and triethylaluminum, a combination of nickel acetylacetonate and triisobutylaluminum, a combination of titanocene dichloride and n-butyl lithium, a combination of zirconocene dichloride and sec-butyl lithium, and a combination of tetrabutoxytitanate and dimethylmagnesium; a ruthenium-carbene complex catalyst described in the subsection "Ring-opening metathesis polymerization catalyst"; dichlorotris(triphenylphosphine) rhodium; and noble metal complex catalysts comprising a ruthenium compound described in Japanese Patent Application Laid-open No. H7-2929, Japanese Patent Application Laid-open No. H7-149823, Japanese Patent Application Laid-open No. H11-109460, Japanese Patent Application Laid-open No. H11-158256, Japanese Patent Application Laid-open No. H11-193323, Japanese Patent Application Laid-open No. H11-109460, and the like.

Examples of the heterogeneous catalyst include hydrogenation catalysts comprising a metal such as nickel, palladium, platinum, rhodium, or ruthenium carried on a carrier such as carbon, silica, diatomite, alumina, or titanium oxide. More specifically, nickel/silica, nickel/diatomite, nickel/alumina, palladium/carbon, palladium/silica, palladium/diatomite, and palladium/alumina can be used, for example. These hydrogenation catalysts may be used individually or in combination of two or more.

Of these, noble metal complex catalysts such as rhodium and ruthenium, and catalysts carrying palladium such as palladium/carbon are preferably used, and a ruthenium-carbene complex catalyst or catalysts carrying palladium are more preferably used. This is because these catalysts do not cause any side reactions such as modification of a functional group contained in the norbornene ring-opened polymer, and can selectively hydrogenate carbon-carbon double bonds in the polymer.

The above-described ruthenium-carbene complex catalyst can be used as a ring-opening metathesis polymerization catalyst and a hydrogenation catalyst. In this case, ring-opening metathesis reaction and hydrogenation reaction can be continuously carried out.

When ring-opening metathesis reaction and hydrogenation reaction is continuously carried out using the ruthenium-carbene complex catalyst, a method of initiating the hydrogenation reaction after activating the catalyst by adding a catalyst modifier such as a vinyl compound, including ethyl vinyl ether, or α-olefin is preferably adopted. A method of activating the catalyst by adding a base such as triethylamine or N,N-dimethylacetamide is also preferably adopted.

Hydrogenation reaction is usually carried out in an organic solvent. The organic solvent used may be appropriately selected according to the solubility of the resulting hydrogenated polymer, and may be the same as the above polymerization solvent. Therefore, hydrogenation reaction may also be carried out, without replacing the solvent after polymerization reaction, by adding the hydrogenation catalyst to the reaction solution or the filtrate obtained by removing the metathesis polymerization catalyst from the solution by filtration.

The conditions for hydrogenation reaction may be appropriately selected according to the type of the hydrogenation catalyst used. The amount of the hydrogenation catalyst used is usually 0.01–50 parts by weight, preferably 0.05–20 parts by weight, and more preferably 0.1–10 parts by weight for 100 parts by weight of the ring-opened polymer. The reaction temperature is usually −10° C. to +250° C., preferably −10° C. to +210° C., and more preferably 0° C. to +200° C. If the temperature is less than −10° C., the reaction rate is too low. If more than 250° C., side reactions may occur easily. The pressure of hydrogen is usually 0.01–10 MPa, preferably 0.05–8 MPa, and more preferably 0.1–5 MPa. If the hydrogen pressure is less than 0.01 MPa, the reaction rate is too low. If more than 10 MPa, a high-pressure reaction apparatus is required.

The time for hydrogenation reaction is appropriately selected in order to control the hydrogenation rate. The reaction time is usually 0.1–50 hours. During this time, 50% or more, preferably 70% or more, more preferably 80% or more, and most preferably 90% or more of the carbon-carbon double bonds of the main chain in the polymer can be hydrogenated.

The norbornene ring-opened polymer and the hydrogenated norbornene ring-opened polymer obtained in this manner exhibit excellent heat resistance, electric characteristics, and the like. Therefore, the polymer and the hydrogenated polymer can be suitably used as materials for heat-resistant optical components such as a plastic lens, spherical lens, nonspherical lens, copier lens, video camera converter lens, pickup lens for an optical disk, and lens for a vehicle component; materials for electronic components such as a semiconductor sealing material, semiconductor underfilm, semiconductor protective film, liquid crystal sealing material, circuit board, circuit protective material, flattening film, and electrical insulating film; and the like.

EXAMPLES

Next, the present invention will be described in more detail by way of examples. The present invention, however, should not be limited to the following examples. In the examples and comparative examples, "part(s)" means "part(s) by weight" and "%" means "wt %" unless otherwise indicated.

(1) Weight Average Molecular Weight

The weight average molecular weight (Mw) of the ring-opened polymer or hydrogenated ring-opened polymer was determined by measurement using gel permeation chromatography (GPC) and expressed in terms of polystyrene.

(2) Monomer Composition Ratio and Hydrogenation Rate

The composition ratio in the ring-opened copolymer and the hydrogenation rates (%) in the hydrogenated ring-opened polymer and the hydrogenated ring-opened copolymer were determined by measurement of the $^1$H-NMR spectrum.

(3) Polymerization Conversion Rate

The polymerization conversion rate (%) was determined by measurement using gas chromatography.

(4) Glass Transition Temperature

The glass transition temperature was measured by a differential scanning calorimeter at a temperature elevation rate of 10° C./min.

Synthetic Example 1

Preparation of Cyclopentadiene/Itaconic Anhydride Addition Product

A glass reaction vessel equipped with a stirrer was charged with a solution of 50 parts of itaconic anhydride in 90 parts of tetrahydrofuran. While gradually adding 35 parts of cyclopentadiene, the mixture was stirred at 0° C. for three hours. The solvent was removed under reduced pressure to obtain a residue. 90 parts of toluene was added to the residue, and the mixture was sufficiently stirred. The precipitated solid component was removed by filtration to obtain a filtrate. 70 parts of n-hexane was added to the filtrate, and the mixture was allowed to stand overnight at −30° C. The precipitate was washed with n-hexane and dried to obtain white crystals. $^1$H-NMR measurement confirmed that these crystals were a cyclopentadiene/itaconic anhydride addition product (a compound of the formula (6), wherein $R^1$ and $R^2$ are hydrogen atoms, Y is an oxygen atom, X is a methylene group, and m is 0).

Synthetic Example 2

Preparation of Cyclopentadiene/Itaconimide Addition Product

Crystals were obtained in the same manner as in Preparation Example 1, except for using itaconimide instead of itaconic anhydride. $^1$H-NMR measurement confirmed that these crystals were a cyclopentadiene/itaconimide addition product (a compound of the formula (6), wherein $R^1$ and $R^2$ are hydrogen atoms, Y is NH, X is a methylene group, and m is 0).

Synthetic Example 3

Preparation of Cyclopentadiene/Maleic Anhydride Addition Product

Crystals were obtained in the same manner as in Preparation Example 1, except for using 45 parts of maleic anhydride instead of 50 parts of itaconic anhydride. $^1$H-NMR measurement confirmed that these crystals were a cyclopentadiene/maleic anhydride addition product (bicyclo[2.2.1]hept-5-ene-2,3-dicarboxylic anhydride).

Example 1

Production of Ring-opened Polymer of Cyclopentadiene/Itaconic Anhydride Addition Product A glass reaction vessel with an internal atmosphere replaced by nitrogen was charged with 300 parts of tetrahydrofuran (THF), 30 parts of the cyclopentadiene/itaconic anhydride addition product (CPDIA) obtained in Preparation Example 1, and 0.7 part of 1-hexene as a molecular weight adjuster (chain transfer agent), and the mixture was heated to 80° C. 4.5 parts of a solution of benzylidene(1,3-dimesitylimidazolydin-2-ylidene)(tricyclohexylphosphine)ruthenium dichloride as a polymerization catalyst in THF (0.162 wt % solution) was added thereto. The mixture was heated and stirred at 80° C. for three hours to obtain a polymer solution. A part of the polymer solution was collected and analyzed to find that the polymerization conversion rate was 99% or more, and the weight average molecular weight (Mw) was 18,000 as expressed in terms of polystyrene. $^1$H-NMR measurement confirmed that the polymer was a ring-opened polymer having the structure of the formula (2).

Example 2

Production of ring-opened copolymer of tetracyclo[4.4.0.1$^{2,5}$.1$^{7,10}$]dodec-3-ene and cyclopentadiene/itaconic anhydride addition product The same polymerization as in Example 1 was carried out, except for using a mixture of 10.9 parts of tetracyclo[4.4.0.1$^{2,5}$.1$^{7,10}$]dodec-3-ene (TCD) and 21.4 parts of a cyclopentadiene (CPD)/itaconic anhydride addition product (CPDIA) as monomers (monomer composition: TCD/CPDIA=40/60 (mol/mol)). The polymerization conversion rate was 96%, the monomer composition ratio (TCD/CPDIA) in the resulting ring-opened copolymer was 41/59 (mol/mol), and the weight average molecular weight (Mw) was 10,000.

Example 3

Production of Hydrogenated Ring-opened Polymer of Cyclopentadiene/Itaconic Anhydride Addition Product An autoclave equipped with a stirrer was charged with the total amount of the polymer solution obtained in Example 1, and the internal atmosphere of the autoclave was replaced by nitrogen. Next, a hydrogenation catalyst solution of 1.38 parts of bis(tricyclohexylphosphine)benzylideneruthenium dichloride and 1.3 parts of ethyl vinyl ether in 13 parts of toluene was added. Hydrogenation was carried out at a hydrogen pressure of 4.5 MPa at 160° C. for four hours. The hydrogenation reaction solution was poured into a large amount of methanol to completely precipitate the solid component. The solid component was collected by filtration, washed, and dried at 70° C. for 12 hours under reduced pressure to obtain a hydrogenated ring-opened polymer. The weight average molecular weight (Mw) of the polymer was 20,000. $^1$H-NMR measurement confirmed that the carboxylic anhydride groups were entirely preserved, and the hydrogenation rate was 91%. The glass transition temperature of the hydrogenated polymer was 153° C.

Example 4

Production of ring-opened copolymer of tetracyclo[$4.4.0.1^{2,5}.1^{7,10}$]dodec-3-ene and cyclopentadiene/itaconimide addition product The same polymerization as in Example 1 was carried out, except for using a mixture of 10.9 parts of tetracyclo[$4.4.0.1^{2,5}.1^{7,10}$]dodec-3-ene (TCD) and 21.2 parts of a cyclopentadiene (CPD)/itaconimide addition product (CPDII) obtained in Preparation Example 2 as monomers (monomer composition: TCD/CPDII=40/60 (mol/mol)). The polymerization conversion rate was 92%, the monomer composition ratio (TCD/CPDII) in the resulting ring-opened copolymer was 40/60 (mol/mol), and the weight average molecular weight (Mw) was 12,100.

Comparative Example 1

Production of ring-opened polymer of bicyclo[2.2.1]hept-5-ene-2,3-dicarboxylic anhydride The same polymerization reaction as in Example 1 was carried out, except for using 30 parts of the cyclopentadiene/maleic anhydride addition product obtained in Preparation Example 3 instead of 30 parts of the cyclopentadiene/itaconic anhydride addition product in Example 1. The polymerization conversion rate was 10%, and the weight average molecular weight (Mw) was 9,800.

Example 5

Production of ring-opened copolymer of 5-endo-6-endo-dicarboxy-2-norbornene and tetracyclo[$4.4.0.1^{2,5}.1^{7,10}$]-3-dodecene A glass reaction vessel equipped with a stirrer was charged with 87 parts of tetrahydrofuran, 17 parts of 5-endo-6-exo-dicarboxy-2-norbornene, 15 parts of tetracyclo[$4.4.0.1^{2,5}.1^{7,10}$]-3-dodecene, and 0.16 part of 1-hexene(5-endo-6-exo-dicarboxy-2-norbornene/tetracyclo[$4.4.0.1^{2,5}.1^{7,10}$]-3-dodecene charge ratio: 50/50 (mol/mol)). Next, a solution of 0.016 part of (1,3-dimesitylimidazolydin-2-ylidene)(tricyclohexylphosphine)benzylideneruthenium dichloride in 13 parts of tetrahydrofuran was added, and the mixture was polymerized at 70° C. After two hours, the polymerization reaction solution was poured into a large amount of a poor solvent to precipitate the solid component. The solid was collected by filtration, washed, and dried at 60° C. for 18 hours under reduced pressure to obtain a ring-opening metathesis polymerization product.

The yield of the resulting polymer was 31 parts (97%). The number average molecular weight (Mn) and weight average molecular weight (Mw) were respectively 18,900 and 41,200 as expressed in terms of polystyrene. The monomer composition ratio (5-endo-6-exo-dicarboxy-2-norbornene)/(tetracyclo[$4.4.0.1^{2,5}.1^{7,10}$]-3-dodecene) in the polymer was 50/50 (mol/mol), showing that a ring-opened copolymer with a composition ratio the same as the charge ratio was obtained.

Example 6

Production of hydrogenated ring-opened copolymer of 5-endo-6-endo-dicarboxy-2-norbornene and tetracyclo[$4.4.0.1^{2,5}.1^{7,10}$]-3-dodecene An autoclave equipped with a stirrer was charged with a solution of 1 part of the copolymer obtained in Example 5 in 80 parts of tetrahydrofuran. Next, a hydrogenation catalyst solution of 0.05 part of bis(tricyclohexylphosphine)benzylideneruthenium dichloride and 0.4 part of ethyl vinyl ether in 10 parts of tetrahydrofuran was added. Hydrogenation reaction was carried out at a hydrogen pressure of 1 MPa at 100° C. for six hours. After the reaction, the reaction solution was poured into a large amount of n-hexane to completely precipitate the polymer. The polymer was removed by filtration, washed, and dried at 90° C. for 18 hours under reduced pressure to obtain a hydrogenated polymer. The number average molecular weight (Mn) and weight average molecular weight (Mw) of the resulting hydrogenated polymer were respectively 17,800 and 39,200 as expressed in terms of polystyrene. $^1$H-NMR measurement confirmed that the carboxyl groups were entirely preserved, and 99% or more of the carbon-carbon double bonds of the main chain were hydrogenated.

Comparative Example 2

Production of ring-opened copolymer of 5-endo-6-endo-dicarboxy-2-norbornene and tetracyclo[$4.4.0.1^{2,5}.1^{7,10}$]-3-dodecene The same polymerization reaction as in Example 5 was carried out, except for using 17 parts of 5-endo-6-endo-dicarboxy-2-norbornene instead of 17 parts of 5-endo-6-exo-dicarboxy-2-norbornene (5-endo-6-endo-dicarboxy-2-norbornene/tetracyclo[$4.4.0.1^{2,5}.1^{7,10}$]-3-dodecene charge ratio: 50/50 (mol/mol)). The yield of the resulting polymer was 14.8 parts (46%). The number average molecular weight (Mn) and weight average molecular weight (Mw) were respectively 13,700 and 24,300 as expressed in terms of polystyrene. The monomer composition ratio (5-endo-6-endo-dicarboxy-2-norbornene)/(tetracyclo[$4.4.0.1^{2,5}.1^{7,10}$]-3-dodecene) in the polymer was 21/79 (mol/mol), showing that a copolymer with a composition ratio significantly differing from the charge ratio was obtained.

Synthetic Example 4

Preparation of 5-carboxy-5-carboxymethyl-2-norbornene

A glass reaction vessel equipped with a stirrer was charged with 90 parts of dioxane, 50 parts of itaconic acid, and 30 parts of cyclopentadiene, and the mixture was stirred at a reflux temperature for five hours. The solvent was removed under reduced pressure to obtain a residue. Water was added to the residue to obtain a precipitate. The precipitate was dried to obtain white crystals. $^1$H-NMR measurement confirmed that these crystals were 5-carboxy-5-carboxymethyl-2-norbornene (a compound of the formula (8), wherein $R^1$ and $R^2$ are hydrogen atoms, $R^6$ and $R^7$ are hydroxyl groups, X is a methylene group, and m is 0), and 80% of the carboxyl groups directly bonded to the 5-position of the norbornene ring were in the exo position.

Synthetic Example 5

Preparation of 5-carboxy-5-methoxycarbonylmethyl-2-norbornene

Crystals were obtained in the same manner as in Example 1, except for using 55 parts of monomethyl itaconate instead of 50 parts of itaconic acid. $^1$H-NMR measurement confirmed that these crystals were 5-carboxy-5-methoxycarbonylmethyl-2-norbornene (a compound of the formula (8), wherein $R^1$ and $R^2$ are hydrogen atoms, $R^6$ is a hydroxyl group, $R^7$ is a methoxy group, X is a methylene group, and m is 0), and 80% of the carboxyl groups directly bonded to the 5-position of the norbornene ring were in the exo position.

Synthetic Example 6

Preparation of 5-carboxy-2-norbornene

Crystals were obtained in the same manner as in Example 1, except for using 27 parts of acrylic acid instead of 50 parts of itaconic acid. $^1$H-NMR measurement confirmed that these crystals were 5-carboxy-2-norbornene, and 10% of the carboxyl groups directly bonded to the 5-position of the norbornene ring were in the exo position.

Example 7

Production of ring-opened polymer of 5-carboxy-5-carboxymethyl-2-norbornene

A polymer solution was obtained in the same procedure as in the Example 1, except for using 30 parts of 5-carboxy-5-carboxymethyl-2-norbornene (CCMN) obtained in Preparation Example 4 as a monomer. A part of the polymer solution was collected and analyzed to find that the polymerization conversion rate was 99% or more, and the weight average molecular weight (Mw) was 18,000 as expressed in terms of polystyrene. $^1$H-NMR measurement confirmed that the polymer was a ring-opened polymer having the structure of the formula (4).

Example 8

Production of ring-opened copolymer of tetracyclo[4.4.0.1$^{2,5}$.1$^{7,10}$]dodec-3-ene and 5-carboxy-5-carboxymethyl-2-norbornene The same polymerization as in Example 7 was carried out, except for using a mixture of 15 parts of tetracyclo[4.4.0.1$^{2,5}$.1$^{7,10}$]dodec-3-ene (TCD) and 18.4 parts of 5-carboxy-5-carboxymethyl-2-norbornene (CCMN) obtained in Preparation Example 4 as monomers (monomer composition: TCD/CCMN=50/50 (mol/mol)), and using 1-hexene in an amount of 0.16 part. The polymerization conversion rate was 98%, the monomer composition ratio (TCD/CCMN) in the resulting ring-opened copolymer was 50/50 (mol/mol), and the weight average molecular weight (Mw) was 34,400.

Example 9

Production of hydrogenated ring-opened copolymer of tetracyclo[4.4.0.1$^{2,5}$.1$^{7,10}$]dodec-3-ene and 5-carboxy-5-carbomethyl-2-norbornene A hydrogenated ring-opened polymer was obtained in the same operation as in the Example 3, except for using the polymer solution obtained in Example 8. The weight average molecular weight (Mw) of the hydrogenated polymer was 10,000. $^1$H-NMR measurement confirmed that the carboxyl groups were entirely preserved, and the hydrogenation rate was 99% or more.

Example 10

Production of ring-opened copolymer of tetracyclo[4.4.0.1$^{2,5}$.1$^{7,10}$]dodec-3-ene and 5-carboxy-5-methoxycarbonylmethyl-2-norbornene The same polymerization as in Example 2 was carried out, except for using a mixture of 15 parts of tetracyclo[4.4.0.1$^{2,5}$.1$^{7,10}$]dodec-3-ene (TCD) and 19.7 parts of 5-carboxy-5-methoxycarbonylmethyl-2-norbornene (CMCMN) obtained in Preparation Example 5 as monomers (monomer composition: TCD/CMCMN=50/50 (mol/mol)). The polymerization conversion rate was 99% or more, the monomer composition ratio (TCD/CMCMN) in the resulting ring-opened copolymer was 50/50 (mol/mol), and the weight average molecular weight (Mw) was 36,100.

Comparative Example 3

Production of ring-opened polymer of 5-carboxy-2-norbornene

The same polymerization reaction as in Example 1 was carried out, except for using 30 parts of 5-carboxy-2-norbornene obtained in Preparation Example 6 instead of 30 parts of 5-carboxy-5-carboxymethyl-2-norbornene in Example 7. The polymerization conversion rate was 22%, and the weight average molecular weight (Mw) of the resulting ring-opened polymer was 6,800.

INDUSTRIAL APPLICABILITY

According to the present invention, a norbornene ring-opened polymer and a hydrogenated norbornene ring-opened polymer can be produced industrially advantageously by ring-opening polymerization of a specific norbornene monomer having a carboxylic anhydride group or a carboxylic imide group in the presence of a metathesis polymerization catalyst. A norbornene ring-opened polymer and a hydrogenated norbornene ring-opened polymer can also be produced industrially advantageously by ring-opening polymerization of a norbornene monomer with a specific configuration having a carboxyl group and an ester group as substituents or having a carboxyl group or an ester group as a substituent in the presence of a metathesis polymerization catalyst. A norbornene ring-opened polymer and a hydrogenated norbornene ring-opened polymer can also be produced industrially advantageously by ring-opening polymerization of a specific norbornene monomer having an alkoxycarbonyl group (carboxyl group) and an alkoxycarbonylalkyl group (carboxyalkyl group) as substituents in the presence of a metathesis polymerization catalyst. Since the norbornene monomer used in the present invention has high polymerization activity, only a small amount of the metathesis polymerization catalyst is required to be used, and a copolymer having desired composition ratio and molecular weight can be easily produced by copolymerization with a norbornene monomer having no functional group. The norbornene ring-opened polymer and the hydrogenated norbornene ring-opened polymer of the present invention exhibit excellent heat resistance, electric characteristics, and the like, and, therefore, are useful as materials for heat-resistant optical components, materials for electronic components, and the like.

The invention claimed is:

1. A norbornene ring-opened polymer in which having a repeating unit represented by the formula (1):

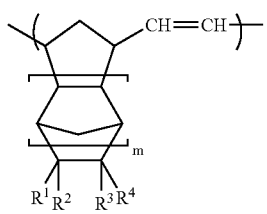

(1)

wherein $R^1$ represents Q, $R^2$ represents Q or $C(=O)R^5$, $R^3$ represents Q or $C(=O)R^6$, and $R^4$ represents Q or X—C$(=O)R^7$, wherein Q represents a hydrogen atom or a hydrocarbon group having 1–10 carbon atoms which may be substituted with a hetero atom-containing functional group or a halogen atom, $R^5$, $R^6$, and $R^7$ individually represent a hydroxyl group or an alkoxyl group having 1–10 carbon atoms which may be substituted with a hetero atom-containing functional group or a halogen atom, or $R^6$ and $R^7$ may be bonded together to form an oxygen atom, a sulfur atom, or NR$^8$, wherein $R^8$ represents a hydrogen atom, a hydroxyl group, a substituted or unsubstituted hydrocarbon group having 1–10 carbon atoms, an alkoxyl group having 1–10 carbon atoms, or an alkoxycarbonyl group having 1–10 carbon atoms, and X represents a substituted or unsubstituted alkylene group having 1–5 carbon atoms, wherein, when $R^2$ is Q, $R^3$ is $C(=O)R^6$ and $R^4$ is X—C$(=O)R^7$, and, when $R^4$ is Q, $R^2$ is $C(=O)R^5$, $R^3$ is $C(=O)R^6$, and $R^2$ and $R^3$ are in the trans position; and m represents 0 or 1; the norbornene ring-opened polymer having a weight average molecular weight determined by gel permeation chromatography of 1,000–1,000,000.

2. The polymer according to claim 1, wherein the repeating unit represented by the formula (1) is a repeating unit represented by the formula (2):

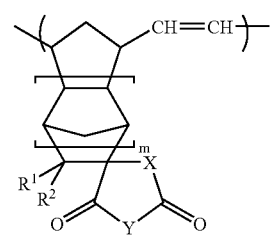

(2)

wherein $R^1$, $R^2$, X, and m are the same as defined in claim 1, and Y represents an oxygen atom, a sulfur atom, or NR$^8$, wherein $R^8$ is the same as claimed in claim 1.

3. The polymer according to claim 1, wherein the repeating unit represented by the formula (1) is a repeating unit represented by the formula (3):

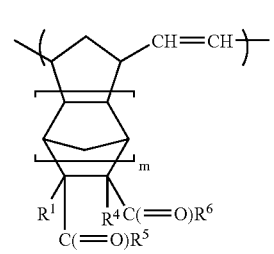

(3)

wherein $R^1$, $R^4$, $R^5$, $R^6$ and m are the same as claimed in claim 1, and the group of the formula: $C(=O)R^5$ and the group of the formula: $C(=O)R^6$ are in the trans position.

4. The polymer according to claim 1, wherein the repeating unit represented by the formula (1) is a repeating unit represented by the formula (4):

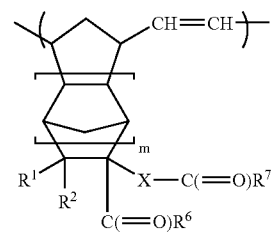

(4)

wherein $R^1$, $R^2$, $R^6$, $R^7$, X, and m are the same as claimed in claim 1.

5. The polymer according to claim 4, wherein the repeating units represented by the formula (4) comprises the repeating units possessing the group of the formula: $C(=O)R^6$ in the exo position in an amount of 70 mol % or more.

6. A process for producing the norbornene ring-opened polymer of claim 1, which comprises polymerizing a norbornene monomer of the formula (5)

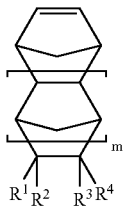

(5)

by ring-opening metathesis polymerization in the presence of a metathesis polymerization catalyst, wherein $R^1$ represents Q, $R^2$ represents Q or $C(=O)R^5$, $R^3$ represents Q or $C(=O)R^6$, and $R^4$ represents Q or $X-C(=O)R^7$, wherein Q represents a hydrogen atom or a hydrocarbon group having 1–10 carbon atoms which may be substituted with a hetero atom-containing functional group or a halogen atom, $R^5$, $R^6$, and $R^7$ individually represent a hydroxyl group or an alkoxyl group having 1–10 carbon atoms which may be substituted with a hetero atom-containing functional group or a halogen atom, or $R^6$ and $R^7$ may be bonded together to form an oxygen atom, a sulfur atom, or $NR^8$, wherein $R^8$ represents a hydrogen atom, a hydroxyl group, a substituted or unsubstituted hydrocarbon group having 1–10 carbon atoms, an alkoxyl group having 1–10 carbon atoms, or an alkoxycarbonyl group having 1–10 carbon atoms, and X represents a substituted or unsubstituted alkylene group having 1–5 carbon atoms, wherein, when $R^2$ is Q, $R^3$ is $C(=O)R^6$ and $R^4$ is $X-C(=O)R^7$, and, when $R^4$ is Q, $R^2$ is $C(=O)R^5$, $R^3$ is $C(=O)R^6$, and $R^2$ and $R^3$ are in trans position; and m represents 0 or 1; the polymer having a weight average molecular weight determined by gel permeation chromatography of 1,000–1,000,000.

7. The process according to claim 6, wherein the metathesis polymerization catalyst used is a ruthenium-carbene complex catalyst.

8. The process according to claim 6 or 7, wherein the norbornene monomer of the formula (5) used is a monomer of the formula (6):

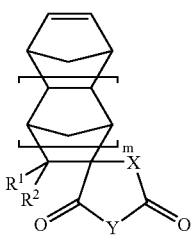

(6)

wherein $R^1$, $R^2$, X, Y, and m are the same as defined above.

9. The process according to claim 6 or 7, wherein the norbornene monomer of the formula (5) used is a monomer of the formula (7):

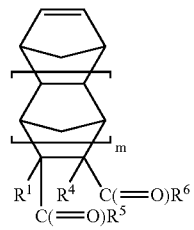

(7)

wherein $R^1$, $R^4$, $R^5$, $R^6$ and m are the same as defined above, and the group of the formula: $C(=O)R^5$ and the group of the formula: $C(=O)R^6$ are in the trans position.

10. The process according to claim 6 or 7, wherein the norbornene monomer of the formula (5) used is a monomer of the formula (8):

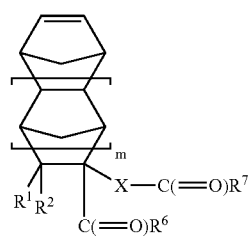

(8)

wherein $R^1$, $R^2$, $R^6$, $R^7$, X, and m are the same as defined above.

11. The process according to claim 10, wherein the norbornene monomer of the formula (8) used comprises the monomer possessing the group of the formula: $C(=O)R^6$ in the exo position in an amount of 70 mol % or more.

12. A hydrogenated product of a norbornene ring-opened polymer obtained by hydrogenating carbon-carbon double bonds in the polymer according to any one of claims 1–5, in which 50% or more of the double bonds are hydrogenated.

13. A process for producing a hydrogenated product of a norbornene ring-opened polymer, comprising hydrogenation of carbon-carbon double bonds in the polymer according to any one of claims 1–5 in the presence of a hydrogenation catalyst.

* * * * *